May 15, 1923.

I. C. MATTHIESSEN 1,454,976

REVERSE MECHANISM FOR MOTOR BOATS

Filed Nov. 2, 1921

Inventor

IRA C. MATTHIESSEN

By Blackwood Bros.,

Attorneys

May 15, 1923. 1,454,976
I. C. MATTHIESSEN
REVERSE MECHANISM FOR MOTOR BOATS
Filed Nov. 2, 1921 2 Sheets-Sheet 2

Inventor
IRA C. MATTHIESSEN
By Blackwood Bros.,
Attorneys

Patented May 15, 1923.

1,454,976

UNITED STATES PATENT OFFICE.

IRA C. MATTHIESSEN, OF ITHACA, NEW YORK.

REVERSE MECHANISM FOR MOTOR BOATS.

Application filed November 2, 1921. Serial No. 512,356.

*To all whom it may concern:*

Be it known that I, IRA C. MATTHIESSEN, residing at Ithaca, in the county of Tompkins and State of New York, a citizen of the United States, have invented certain new and useful Improvements in Reverse Mechanism for Motor Boats; and I do hereby declare the following to be a full, clear, and exact description of the invention, such as will enable others skilled in the art to which it pertains to make and use the same.

My invention relates to improvements in reverse mechanism for shafts, and more particularly to electrically operated reverse gear for the shafts of motor boats.

The invention consists in the several features, and in the construction, combination and arrangement of such features as more fully hereinafter described and claimed.

The object of the invention is to provide means for reversing the driving or driven shafts of a motor boat by electrical means, thereby eliminating the old style of manually operated mechanical reversing mechanisms.

A further object is to provide electrical means by which the reversing mechanism may be quickly and easily controlled from the bridge or any other position where it is mounted on a motor boat.

A further object is to provide the reversing means with a magnetic clutch which will, without any undue strain or stress on the engine and shafts, cause the shafts to be engaged slowly and take up the load slowly and operate more evenly than if it were done mechanically.

A further object is to provide means for electrically controlling and reversing of the power shafts of a motor boat located within easy reach of the navigator.

A still further object is to provide means for electrically controlling the reversing of the power shaft of a motor boat which is exceedingly simple, inexpensive and durable in construction, and easy and efficient in operation.

Referring to the drawings:—

Figure 1:
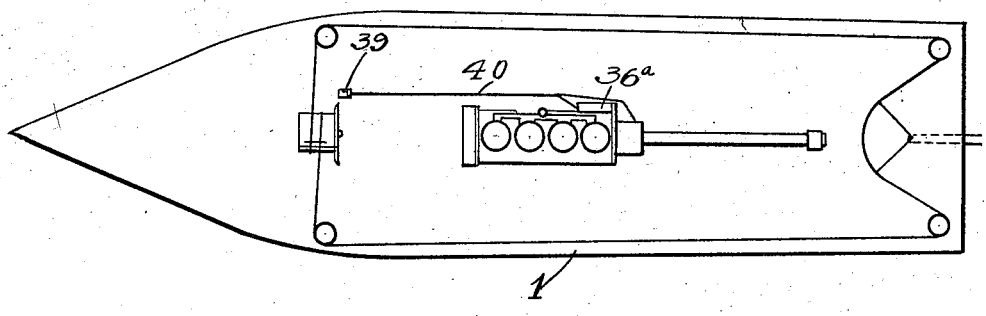
Fig. 1 is a diagrammatic view of a motor boat with my invention applied.

In the drawings, in which like reference characters designate like parts throughout the drawings, 1 represents a motor boat, 2 the drive or crank shaft of the engine or other source of power for driving or propelling the motor boat, mounted in a bearing 3 of suitable character, 4 the driven or propeller shaft mounted in bearings 5 and 6, the inner ends of the shafts being enclosed in a casing 7, made preferably of metal and adapted to be mounted in any suitable manner in a motor boat.

The inner end of the driven or propeller shaft 4 has a magnetic disk 8 keyed thereon in such manner that it permits the disk to slide longitudinally, said disk having magnetic coils 11.

The inner end of the drive or crank shaft 2 has keyed thereon a magnetic disk 10 having magnetic coils 11 and a short sleeve 12 is mounted loosely on the shaft 2, between the magnetic disk 10 and the bearing 3 and is provided with an integral magnetic disk 13 having magnetic coils 11 and a gear 14 is keyed on the loose sleeve 12.

The reversing mechanism for the shafts is also enclosed in the casing 7 and comprises the gear 15 fixed on the driven or propeller shaft 4 between the bearings 5 and 6, a loose or idle gear 16 is provided by keying said gear on a short shaft 17 which in turn is idly mounted in bearings 18 and 19 of the casing 7, a gear 20 keyed on an auxiliary shaft 21 mounted in bearings 22, 23 and 24 of the casing, the gear 16 being in mesh with the gears 15 and 20, a gear 25 fixed on the shaft 21 and meshing with the gear 14 secured on the loose sleeve 12 of the drive or crank shaft 2.

Slip rings 26 are provided on the driven or propeller shaft 4 and connected to the magnetic disk 8 by wires $26^a$, $26^b$ passing through holes in the shaft 4 and wires 27 and 28 each having a brush 29 which contacts and makes electrical connection with the slip rings. Slip rings 30 and 31 are provided on the drive or crank shaft 2 and electrically connected to the magnetic disk 10 by wires $30^a$, $30^b$ passing through holes in the shaft 2 and wires 34 and 35 each having a brush 36 which contacts and makes electrical connection with the slip rings. Slip rings 46 and 47 are also provided and electrically connected to the magnetic disk 13 by wires 46ᵃ, 46ᵇ passing through holes in the gear 14 and wires 32 and 33 each having a brush 36 which contacts and makes electrical connection with the slip rings. The wires 27, 28, 32, 33, 34 and 35 are connected to a generator or source of electrical energy and transmit power to the coils of lateral magnetic disks 8 and 13 and the intermediate magnetic disk 10, said disks constituting a magnetic clutch.

Figure 5:
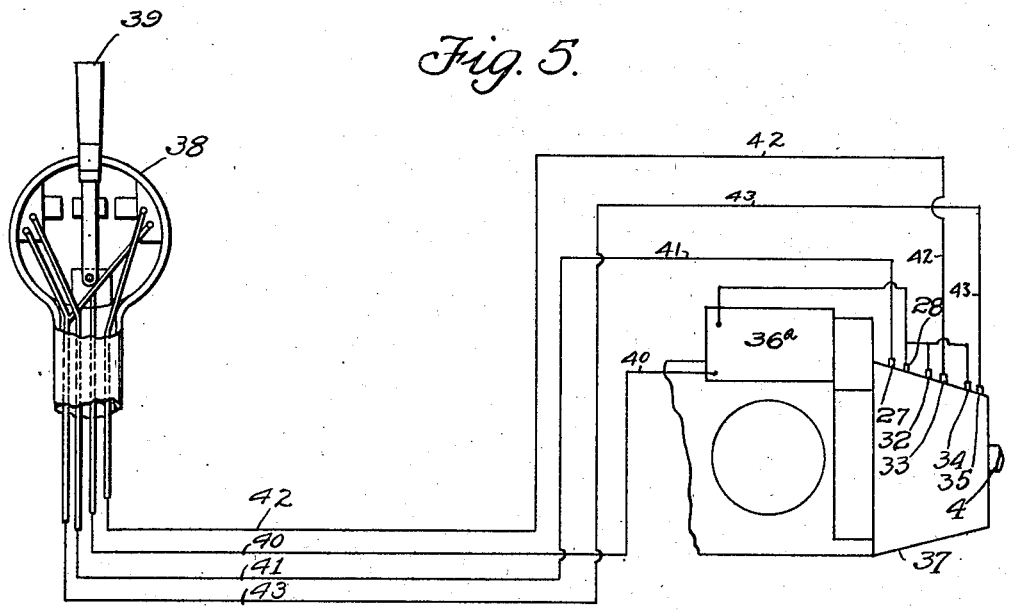
Fig. 5 is a view showing the wiring used in connection with my invention.
Figure 4:
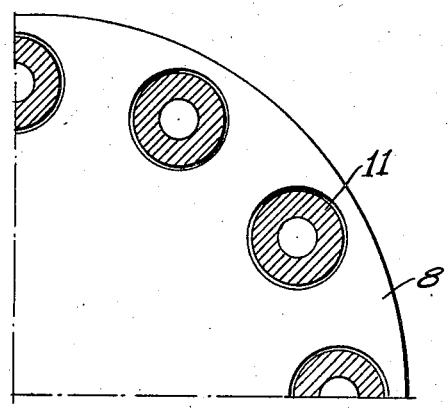
Fig. 4 is a face of one of the members of the magnetic clutch.
Figure 3:
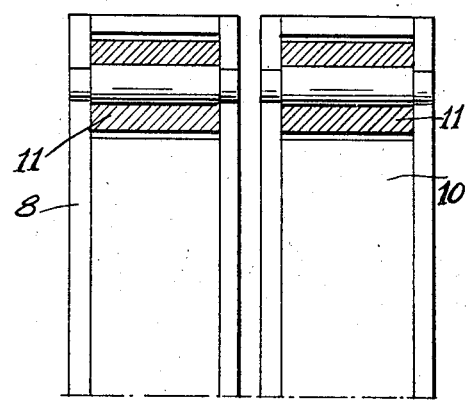
Fig. 3 is a cross sectional view of a portion of two members of the magnetic clutch.

Referring now particularly to Figure 5 of the drawings, 36ᵃ represents a generator, 37 a casing enclosing the magnetic clutch mechanism and 38 the control switch having an operating handle 39.

When the handle 39 is in its left hand position it connects wires 40 and 41, wire 41 being connected to terminal 27, the magnets in 8 are energized by completing the circuit through wire 28 and the positive terminal of the generator 36ᵃ and at the same time wires 40 and 43 are connected, wire 43 being connected to terminal 35, the magnets in 10 are energized by completing the circuit through wire 34 and the positive terminal of the generator 36ᵃ and disks 8 and 10 engage and power is transmitted from the drive or crank shaft 2 to the driven or propeller shaft 4. The terminals 28, 32 and 34 are positively connected to the positive terminal of the generator 36ᵃ.

When the handle 39 is in its vertical or neutral position all the circuits are broken or open and no power is transmitted to the drive or driven shafts.

When the handle 39 is in its right hand position wires 40 and 43 are again connected and magnetic disk 10 is energized and at the same time wires 40 and 42 are connected, wire 42 being connected to terminal 33 and the magnets in 13 are energized by completing the circuit through the wire 32 and the positive terminal of the generator 36ᵃ and disks 10 and 13 engage and power is transmitted from the drive or crank shaft through the reversing gears 14, 25, 20, 16 and 15 and shafts 17 and 21 to the driven or propeller shaft 4, thereby reversing the rotation of the driven or propeller shaft.

Figure 2:
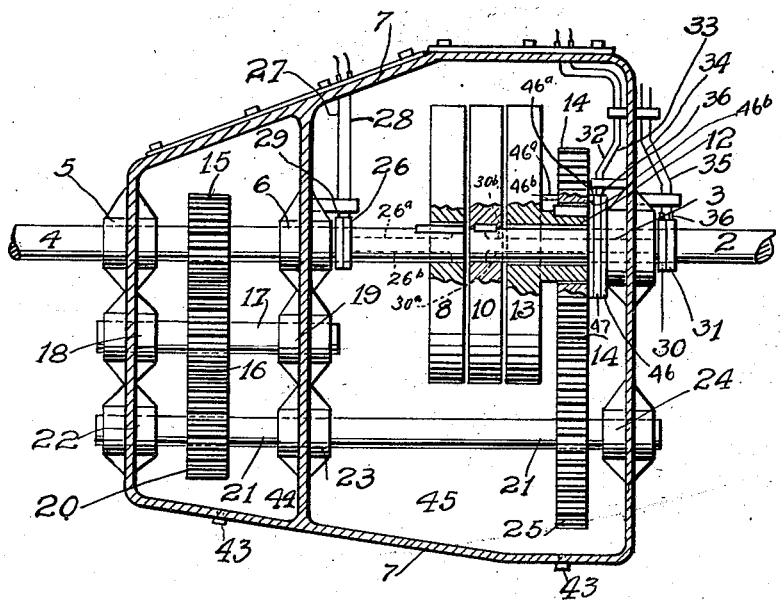
Fig. 2 is a side view partly in section.

Referring now particularly to Figure 2 of the drawings, the operation of the reversing mechanism is as follows:—

The magnetic clutch being in three parts 8, 10 and 13, when the magnetic disks 8 and 10 are energized, by closing the control switch, they attract each other and contact, by reason of their magnetic fields that are set up, and with 10 rotating it will tend to drag 8 along with it and the power from the drive or crank shaft 2 will be transferred to the driven or propeller shaft 4 directly, but when the magnetic disks 10 and 13 are energized the power from the drive or crank shaft 2 will be transferred to the short shaft 21 through gears 14 and 25, and to the driven or propeller shaft 4 through gears 20, 15 and 16, the gears 15 and 20 being secured to shafts 4 and 21, respectively, and gear 16 secured on idle shaft 17, reverse the rotation of the driven or propeller shaft 4 with relation to the drive or crank shaft 2.

Drain plugs 43ᵃ are provided in the bottom of the casing 7 for draining off the oil which has been used to lubricate the series of gears.

The compartment 44 of the casing 7 is adapted to be filled with lubricating oil; while the compartment 45 is, preferably, only partly filled with lubricating oil in order not to have a retarding effect on the clutch mechanism.

Where heavy work is to be done, and the magnetic fields are not strong enough to transmit all the power, disk 8 is equipped with a feather key, that allows it to move a short distance along the shaft. When the magnets are energized disk 8 would be attracted to disk 10, and establish frictional contact between their faces. The contact would be over a large surface, so that wear on them would be reduced to a minimum. A spring could be used to disengage them when the current is shut off. Disk 13 is also slidably mounted on its shaft by means of a feather key, so that it can move into contact with the other face of disk 10.

The engine starting motor may be used as a generator, or a separate one supplied. By using a generator no batteries would be necessary, thus eliminating the extra expense and care of same.

Although I have described my invention as applied and used in connection with the shafts of a motor boat, it is equally applicable to any other mechanism where it is desired to reverse the motion of shafts.

I do not wish to be understood as limiting myself to the specific details of construction and arrangement as herein described and illustrated, as it is manifest that variations and modifications may be made in the features of construction and arrangement, in the adaption of the device to various conditions of use, without departing from the spirit and scope of my invention and improvements. I therefore reserve the right to all such variations and modifications as properly fall within the scope of my invention and the terms of the following claims.

What I claim is:—

1. In a device for reversing the direction of rotation of the driven shaft of a motor boat, a drive shaft, a driven shaft in alignment with the drive shaft, a magnetic clutch comprising an intermediate magnetic member fixed on the drive shaft, a lateral magnetic member loose on the drive shaft and a lateral magnetic member slidable on the driven shaft, means for operatively connecting the loose magnetic member on the drive shaft with the driven shaft, and means for successively energizing said lateral magnetic members and said intermediate magnetic member and causing the slidable lateral magnetic member on the driven shaft to contact with the fixed intermediate magnetic member on the drive shaft for direct drive or causing the loose lateral magnetic member on the drive shaft to contact with the fixed magnetic member on the drive shaft, and through the means for operatively connecting said loose magnetic member with the driven shaft, reverse the direction of rotation of the driven shaft.

2. In a device for reversing the direction of rotation of the driven shaft of a motor boat, a driven shaft having a lateral slidably mounted magnetic clutch member and a fixed gear, a drive shaft having a laterally slidable magnetic clutch member loosely mounted thereon having a gear and an intermediate fixed magnetic clutch member, means for operatively connecting the gear of the driven shaft with the gear of the loosely mounted laterally slidable clutch member and means for successively energizing either of the laterally slidable magnetic clutch members, at a time, and the intermediate magnetic clutch member and causing them to contact for direct drive or through the medium of the gears and the means operatively connecting them reversing the direction of rotation of said shafts with relation to each other.

In testimony whereof I have affixed my signature.

IRA C. MATTHIESSEN.